United States Patent [19]

Meineke et al.

[11] 4,164,267
[45] Aug. 14, 1979

[54] EXHAUST MUFFLER

[76] Inventors: Sam W. Meineke; Harold Nedell, both of 6330 W. Loop South, Suite 103, Bellaire, Tex. 77401

[21] Appl. No.: 784,158

[22] Filed: Apr. 4, 1977

Related U.S. Application Data

[63] Continuation of Ser. No. 598,709, Jul. 24, 1975, abandoned.

[51] Int. Cl.$^2$ .............................................. F01N 1/00
[52] U.S. Cl. ................................................ 181/255
[58] Field of Search ............................ 181/247–255, 181/282

[56] References Cited

U.S. PATENT DOCUMENTS

| | | | |
|---|---|---|---|
| 2,132,425 | 10/1938 | List | 181/253 |
| 3,289,785 | 12/1966 | Walker | 181/249 |
| 3,412,825 | 11/1968 | Hall | 181/282 |
| 3,557,903 | 1/1971 | Straw | 181/255 |
| 3,955,643 | 5/1976 | Clark | 181/248 |

FOREIGN PATENT DOCUMENTS 51-31611  3/1976  Japan.

Primary Examiner—Robert C. Watson
Attorney, Agent, or Firm—Arnold, White & Durkee

[57] ABSTRACT

Apparatus for installing a universal muffler in a vehicle exhaust system including resizing the length and/or diameter of the inlet and outlet tubes of a muffler, the inlet and outlet tubes being fabricated from treated steel having suitable temperature and molability characteristics, and directly coupling these tubes to existing pipes in the vehicle exhaust system.

4 Claims, 9 Drawing Figures

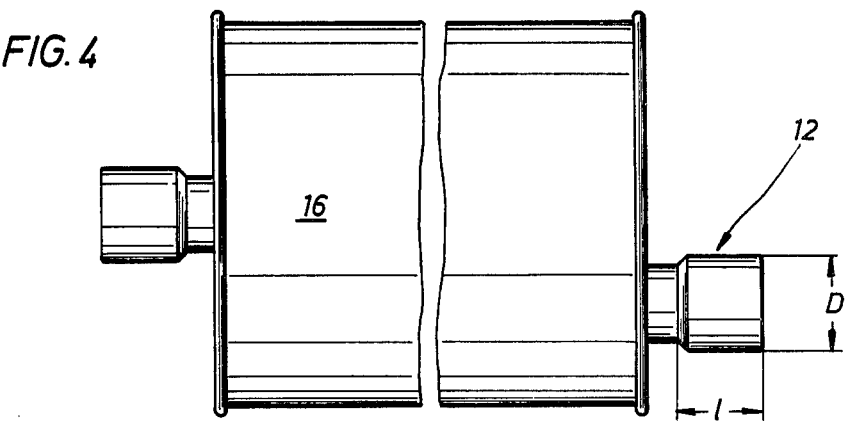
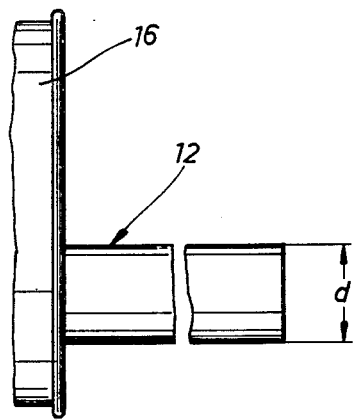 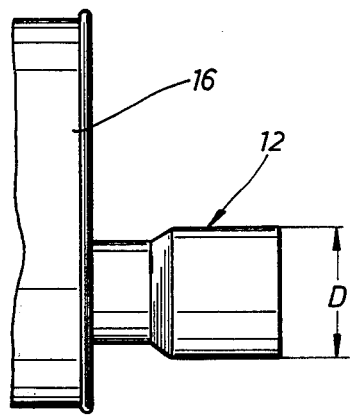 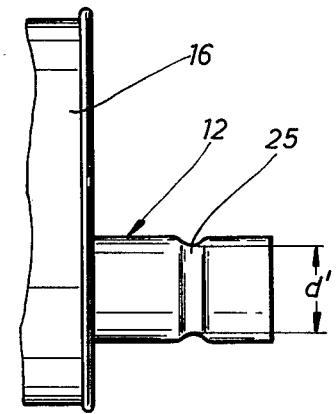
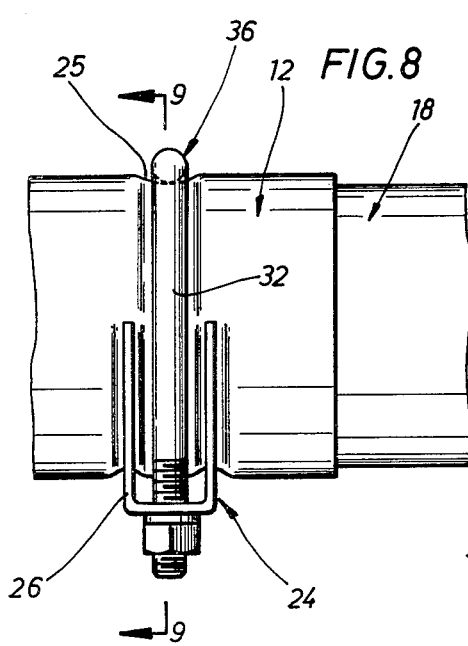 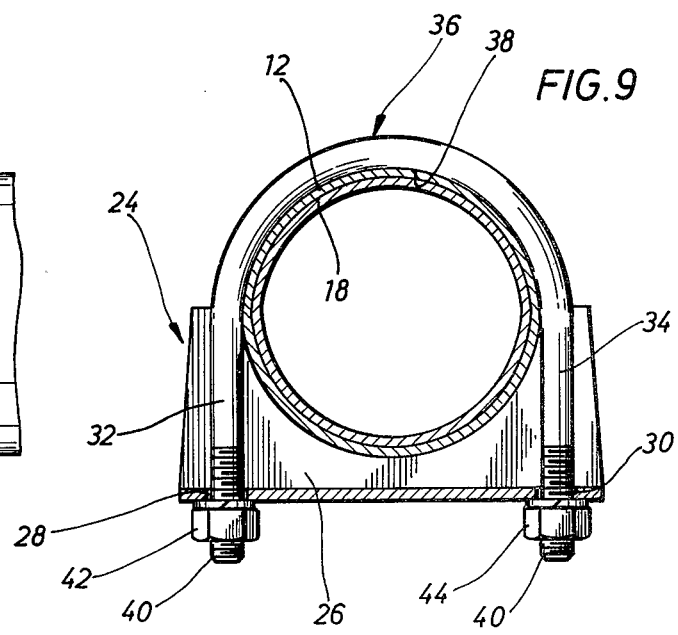

EXHAUST MUFFLER

CROSS REFERENCE TO RELATED APPLICATIONS

This application is a continuing application of our application Ser. No. 598,709, filed July 24, 1975, now abandoned.

BACKGROUND OF THE INVENTION

The present invention relates generally to a novel muffler and method of installing the same in a vehicle exhaust system. More particularly, this invention concerns the use of a "universal" or standardized muffler and method for installing the same in a wide variety of vehicles without the necessity of utilizing tubular extensions or adapters to install the muffler.

In the past, it has been a common practice to replace worn mufflers in automotive vehicles with an exact replacement part provided by the manufacturer of the vehicle. Whereas this provided the owner of the vehicle with a product having known characteristics and a known life expectancy, many owners were unable to obtain satisfactory service from automobile dealers performing the muffler replacement. In many cases, automobile dealers may not be convenient to a vehicle owner or may be understaffed in relation to the business demand imposed by muffler replacements or may be too costly.

As a result, there developed a need for muffler replacement service facilities operated independently of automobile dealers. These independent muffler organizations would stock replacement mufflers for a very large proportion of vehicles sold in the United States and abroad. However, in order for such organizations to provide satisfactory service, an extensive inventory was required which resulted in a significant expense to the owner or operator of such facilities.

As a result, attempts have been made in the prior art to provide a single "universal" muffler capable of being installed satisfactorily in a wide variety of vehicles or vehicle types. However, because such a variety of muffler geometries exists in vehicles, even among vehicles produced by the same manufacturer, some tailoring of even a "universal" replacement muffler generally is required.

Typically, mufflers utilized in the exhaust system of most automotive vehicles are supported by means of connection with an exhaust pipe and a tail pipe in such a manner to isolate the muffler from contact with any other portion of the vehicle. The exhaust pipe and the tail pipe of the exhaust system are secured to struts or frame members of the vehicle in a conventional manner.

In order to replace a worn muffler, it is conventional practice to uncouple the connection of the muffler with the exhaust pipe and the tail pipe so as not to damage the exhaust pipe or tail pipe and to install a muffler having substantially the same geometry as the worn muffler. Of course, sometimes the exhaust pipe or tail pipe may be damaged in the vicinity of the muffler and may require either replacement or a cutting away of the damaged portion. To accommodate variations in geometry, extension members are utilized to span the distance between inlet and outlet tubes of the muffler and the exhaust pipe or tail pipe of the vehicle.

In some known prior art arrangements, the muffler geometry is deliberately designed not to span the gap between the facing end of the exhaust pipe and the facing end of the tail pipe. In such arrangements, an extension member is required at both ports of the muffler for coupling to the vehicle pipes. Typically, one clamp is required to securely fasten a first extension member to the facing end of an exhaust pipe, and a second clamp is required to secure the inlet of the muffler to the extension. Similarly, a third clamp is required to couple a second extension to the tail pipe, and a fourth clamp is required to secure the outlet of the muffler to the second extension. With this arrangement, one muffler design might accommodate a wide variety of vehicle types so long as extensions or adapters and clamps were secured to accommodate the distance between the facing ends of the exhaust pipe and the tail pipe.

However, with this prior art arrangement, four separate seams are provided, all of which provide points of possible failure in the exhaust system. For example, a failure of any of the four clamps might render the exhaust system ineffective. These clamps may be the source of rust which may seriously reduce the life of the exhaust system. Moreover, it is a relatively expensive operation to custom fit two extensions for every muffler installed. In many instances, these extensions may also couple an exhaust pipe having one diameter to a muffler inlet having another diameter, and a coupling may be required between the muffler outlet and a tail pipe having a yet different diameter. Such extensive custom tailoring results in increased labor costs which are passed along to the owner of the vehicle.

In any event, it has been found to be quite expensive, time consuming and cumbersome to provide four clamps and to stock a variety of adapter pipes to couple the known universal mufflers to existing exhaust systems.

There have been some attempts to obviate the problem of maintaining a large inventory of couplings or adapters to couple replacement mufflers to existing exhaust systems. For example, mufflers utilizing inlet and outlet pipes having telescopic members extensible to couple together with the exhaust pipes and tail pipes of vehicles have been proposed. However, such devices still require the use of four separate clamps as discussed above and demonstrate a susceptibility to failure.

Attempts have also been made to alter the diameter of inlet and outlet tubes on conventional mufflers in order to fit such tubes together with pipes having a significantly different size diameter. However, such conventional mufflers have inlet and outlet tubes which are too brittle for diameter deformation.

Recognizing the need for an improved muffler and method of installing the same, it would therefore be desirable to provide a universal muffler which may be readily installed with a reduced number of clamps with lower cost and time required for the installation.

OBJECTS AND SUMMARY OF A PREFERRED EMBODIMENT OF THE INVENTION

It is, therefore, a general object of the present invention to provide a novel muffler and method of installing the same which minimizes or reduces the problems of the type previously noted.

It is a more particular object of the present invention to provide a universal muffler which utilizes "cut-to-length" end tubes to obtain the proper length requirements.

It is another object of the present invention to provide a novel muffler and method of installing the same which reduces the number of clamps required to install the muffler.

It is yet another object of the present invention to provide a novel muffler and method of installing the same which substantially reduces the need for adapter or extension pipes.

It is still another object of the present invention to provide a novel muffler and method of installing the same which reduces the number of seams subject to failure in a vehicle exhaust system.

It is yet still another object of the present invention to provide a novel muffler and method of installing the same which can accommodate varying diameter requirements without the necessity of utilizing adapter pipes.

It is a further object of the present invention to provide a novel muffler and method of installing the same which has a substantially infinite shelf life and which has inlet and outlet pipes which are not liable to become too brittle to enable radial deformation.

A novel muffler and method of installing the same according to a preferred embodiment of the invention intended to substantially accomplish the foregoing objects includes a muffler having an elongate body portion with an inlet pipe at one end and an outlet pipe at the other end. The inlet and outlet pipes preferably are fabricated from "AK" (Aluminum Killed) steel with at least one of the inlet or outlet pipes being extra long. In the method of installing this muffler, the dimensions are ascertained of a zone for receiving a replacement muffler in the undercarriage of a vehicle. An appropriate muffler is selected having a body portion adaptable to be received in the muffler receiving zone in the vehicle. The extra long inlet or outlet pipe of the muffler is then cut to a predetermined length in order to position the muffler between the exhaust pipe and tail pipe in the vehicle. After the appropriate cutting has taken place, the inlet and/or outlet pipes of the muffler may be deformed to provide an appropriate diameter to couple the muffler to the exhaust pipes by fastening the inlet to the exhaust pipe using a single clamp and by fastening the outlet to the tail pipe with a single clamp. Inasmuch as the inlet and outlet pipes of the muffler preferably are fashioned from AK steel, which is relatively maleable, the inlet and outlet pipes may be swaged to enlarge the diameter of the pipe or the diameter may be reduced by virtue of the compressional forces imposed by the clamp.

Examples of more important features of this invention have thus been summarized rather broadly in order that the detail description thereof that follows may be better understood, and in order that the contribution to the art may be better appreciated. There are, of course, additional features of the invention that will be described hereinafter and which will also form the subject of the claims appended hereto. These other objects, features, and advantages will become apparent with reference to the following detailed description of a preferred embodiment of the invention, in connection with the accompanying drawings, wherein like reference numerals have been applied to like elements, in which:

BRIEF DESCRIPTION OF THE DRAWINGS

FIG. 4 pictorially depicts the muffler of FIG. 3 wherein the now cut inlet or outlet pipe has been sized to an appropriate diameter;

FIG. 5 is a more detailed view of the inlet or outlet pipe of FIG. 3;

FIG. 6 is a more detailed view of the inlet or outlet pipe of FIG. 4 which has been expanded to provide an increased diameter;

FIG. 7 is a detailed pictorial view of an inlet or outlet pipe, the diameter of which has been reduced by the compression of a conventional muffler clamp;

FIG. 8 is a detailed view of an inlet or outlet pipe which has been coupled to an existing pipe on a vehicle and which has been reduced in diameter by a conventional muffler clamp; and FIG. 9 is a section view taken through section lines 9—9 in FIG. 8.

Figure 1:
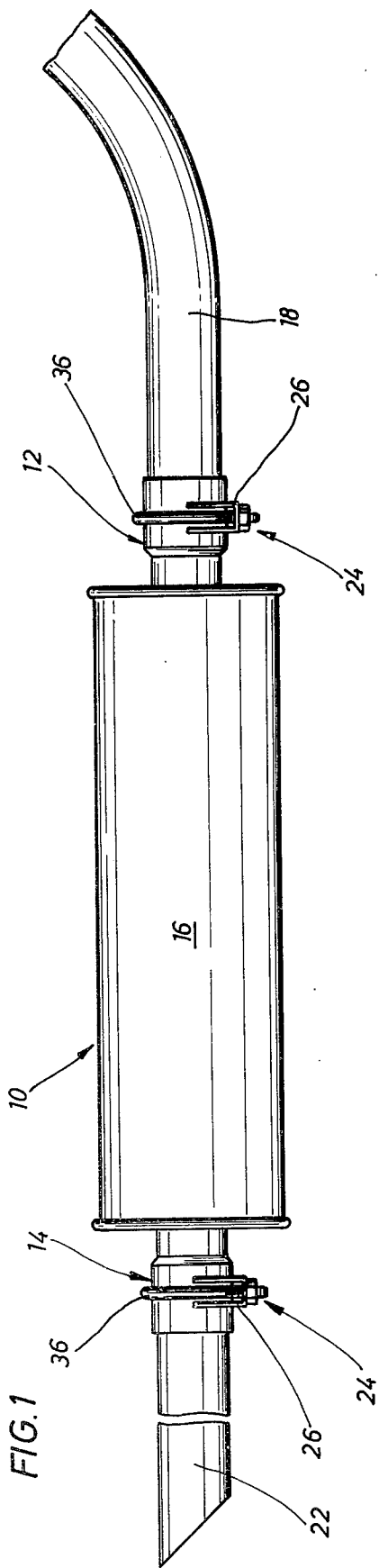
FIG. 1 depicts a muffler of the present invention installed between an exhaust pipe leading from the exhaust manifold of an engine and a tail pipe leading to the atmosphere.

As may be seen in FIG. 1, there is provided a muffler 10 according to the present invention having a body portion 16 and an inlet pipe or tube 12 and an outlet pipe or tube 14. The inlet and outlet tubes 12 and 14 are respectively coupled to a facing end of an exhaust pipe 18 and a facing end of a tail pipe 22 of a vehicle (not shown). The exhaust pipe 18 communicates with an exhaust manifold of a conventional internal combustion engine (not shown). The tail pipe 22 communicates with the atmosphere.

Inasmuch as the distance between the face ends of the exhaust pipes 18 and the tail pipe 22 will vary from one vehicle to the next, some resizing or "dressing" of the inlet and/or outlet tubes of the muffler usually will be required to provide a satisfactory fit. As may be seen in FIGS. 1–4, the inlet tube 12 of the muffler 10 has been resized to expand the inside diameter of the inlet tube 12 from "d" to "D" to accommodate the outside diameter of the facing end of the exhaust pipe 18. This exhaust pipe may be that originally provided from the manufacturer of the vehicle or may be a replacement item depending upon the condition of the exhaust pipe.

The inlet tube 12 and the outlet tube 14 are both preferably comprised of steel which has been treated with small amounts of aluminum to deoxidize or degasify the steel in order to provide a material having a relatively large coefficient of expansion. This treatment additionally serves to prevent the tubing from becoming brittle after, say, several months of storage. The input and output tubes 12 and 14 preferably are sufficiently plastic to permit an expansion of the tubing (See FIG. 6) by a conventional swaging tool (not shown) known to those in this art. Likewise, the steel tubing is preferably sufficiently plastic to permit the diameter of the tubing to be reduced by means of compressional forces provided by a conventional muffler clamp (See FIGS. 7–9). Whereas aluminum killed steel is preferred, steel may be similarly treated with silicon or manganese to achieve improved maleability characteristics.

Figure 2:
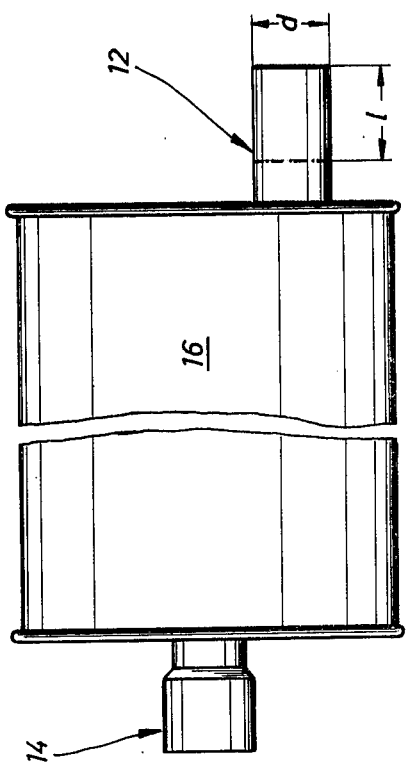
FIG. 2 pictorially depicts a muffler having an extra long inlet or outlet pipe which has not yet been modified.

As may be seen in FIG. 2, mufflers according to the present invention are provided with either an inlet tube 12 or an outlet tube 14 of extraordinary length. In most cases, a muffler 10 according to the present invention will be reversible so that either end may be designated "inlet" or "outlet". In preferred form, the length of the oversized tube will typically be greater than required for most vehicles, but is at least large enough to accommodate the greatest specified distance between the face ends of the exhaust pipe 18 and tail pipe 22. As a result, an oversized or extra long tube having a length of "L" may be trimmed down to a variety of lengths to accommodate a variety of vehicles.

Figure 3:
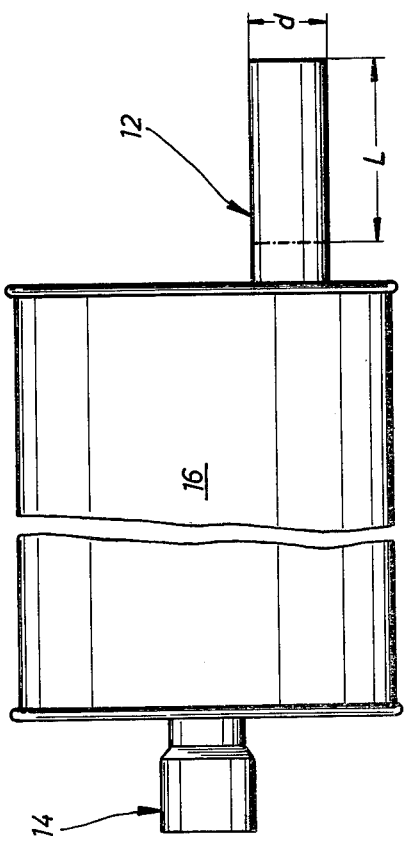
FIG. 3 pictorially depicts the muffler of FIG. 2 wherein the inlet or outlet pipe has been cut to a predetermined length.

As shown in FIG. 3, the inlet tube 12 has been trimmed to a length "l" to accommodate a particular vehicle.

Most of the mufflers according to the present invention will have inlet and outlet tubes of the same diameter. This diameter is selected to overlie with a relatively snug fit the exhaust pipes and tail pipes of a vast majority of vehicles. However, occasions will arise where older vehicles or less conventional vehicles have either exhaust pipes or tail pipes which do not fit together with the corresponding inlet or outlet tubes of the muffler. For example, as shown in FIGS. 3–6, the diameter "d" of the inlet tube 12 and outlet tube 14 may be expanded to diameter "D" by means of a well-known swaging tool which can increase the diameter "d" from, say, two inches to a diameter "D" of about two and one-half inches.

After the diameter of an inlet tube or an outlet tube has been expanded to fit over an exhaust pipe or tail pipe, a clamp 24 is used to reduce slightly the diameter of the inlet tube or outlet tube to provide a secure coupling of the muffler in the exhaust system. The clamp 24 functions to deform the tubes 12 or 14 to provide a channel 25 having a reduced diameter "d" (FIG. 7). The extent to which the original diameter "d" may be reduced is generally dependent upon the strength of the elements of the clamp. The clamp shown in FIGS. 8 and 9 is a conventional clamp and includes a saddle member 26 having a pair of apertures 28 and 30 which receive the leg portions 32 and 34 of a U-shaped clamping bolt 36. The bight portion 38 of the clamping bolt 36 encircles about one-half of the periphery of the inlet tube 12 (or outlet tube), and the saddle 26 embraces substantially the remaining one-half of the periphery of the tube 12. The leg portions 32 and 34 are provided with threads 40 to receive clamping nuts 42 and 44 for drawing up the clamp components into snug engagement with the tube to draw the tube into tight engagement with the exterior service of the pipe 18 to which the muffler 10 is being coupled. It will, of course, be appreciated that the clamping bolt 36 is pulled sufficiently tight against the saddle portion to form the channel 25 under the clamping bolt 36 or a double channel under a portion of saddle 26 which provides a fluid tight coupling of the muffler tube 12 to the particular pipe 18 of the exhaust system. Moreover, the coupling formed by the clamp 24 must be of sufficient strength to support the weight of the muffler 10 during relatively rough driving conditions to which the vehicle may be subjected.

It will, of course, be appreciated that other types of clamping arrangements may be utilized. For example, a metal strap having a buckle may be utilized. In any event, whatever clamp is selected, it must be capable of providing sufficient compressive forces on the inlet and outlet tubes 12 and 14 to reduce at least slightly the diameter of the tubes in order to form a fluid tight seal. In instances where the diameters of the respective coupled members are sufficiently different and where the diameter of the muffler tube exceeds the diameter of the exhaust pipe or tail pipe, the clamp must have sufficient strength to reduce the inside diameter of the muffler portion to the outside diameter of the existing pipe to provide a satisfactory coupling. In instances where the difference in diameters is, say, about an eighth of an inch, conventional clamps of the type disclosed in U.S. Pat. No. 2,719,345 to Riker may be adequate. In instances where the difference in diameters exceeds, say, one-fourth inch, it may be necessary to utilize clamps fabricated from hardened steel having a capability of greater compressive forces.

The method of installing the muffler 10 as a replacement for a worn muffler in the exhaust system of an internal combustion engine of an automotive vehicle requires a series of steps. The regions of the existing exhaust pipe 18 and the tail pipe 22 adjacent the worn muffler are severed or cut off or unclamped from the muffler in order to remove the worn muffler.

The dimensions of a zone adapted to receive a replacement muffler are determined, and a replacement muffler is selected. The selection of a replacement muffler will generally be premised on the geometry of the muffler receiving zone of the vehicle.

In the removal of the worn muffler, it may have been necessary to remove a short length (one or two inches) of the exhaust pipe or the tail pipe. A muffler constructed in accordance with the present invention is especially adapted to replace a worn muffler without the necessity of introducing extensions or adapter pipes to extend the length of either the inlet tube or outlet tube of the muffler. Replacement mufflers in the prior art would require an extension to gap the distance of the length of the removed rusted or damaged end portions of the exhaust pipe or tail pipe. With a muffler of the present invention, the oversized inlet tube provides additional length to accommodate the distance lying between the facing ends of the exhaust pipe and the tail pipe.

Therefore, there is provided by the present invention a muffler especially adapted to replace a worn muffler without requiring the insertion of an extension between the muffler and the existing pipes on the vehicle. This method is accomplished by means of apparatus comprising an elongated inlet or outlet tube fabricated from a relatively soft but heat resistant material, preferably AK steel, which may be cut and/or the diameter of which may be resized. The diameter of the inlet and outlet tubes of a muffler of the present invention may be swaged to a greater diameter or compressed by means of a conventional muffler clamp to a reduced diameter.

The cutting of the inlet or outlet tubes may be accomplished through the use of conventional pipe cutting devices. Similarly, the swaging may be accomplished through conventional devices. Thus, no special equipment is required to realize the full advantages of the muffler and method of installing the same according to the present invention.

SUMMARY OF ADVANTAGES AND SCOPE OF THE INVENTION

It will be appreciated that in constructing a muffler and installing the same according to the present invention, certain significant advantages are provided.

Through the method of this invention, the replacement muffler may be quickly and easily installed between the existing exhaust pipe and tail pipe and, by means of a single clamp at each end of the muffler, the muffler may be fixedly mounted and supported solely by the exhaust pipe and the tail pipe.

The same muffler may be adaptable for various installations by predetermining the length to which the inlet and/or outlet tubes of the muffler will be cut depending upon the distances between an exhaust pipe and a tail pipe of a vehicle exhaust system. In addition, the diameter of the inlet and outlet tubes of the muffler may be resized to overlie the exhaust pipe and tail pipe in such a manner to minimize friction between the coupling members prior to the tightening of a clamp.

With the present system, a very few types of mufflers may be manufactured which would be adaptable to a vast majority of existing types of automotive vehicles, particularly in the United States. Whereas the preferred embodiments of the present invention have been most successfully utilized in connection with American built automotive vehicles, it is clearly within the scope of the present invention to adapt the invention to foreign vehicles, tractors, large trucks and other machinery requiring a muffler.

In practicing the method of the present invention, only one seam or joint is typically required at either end of the muffler. That is, unlike many prior art mufflers, the present invention requires only one clamp at the inlet and one clamp at the outlet end of the muffler thereby reducing the number of locations at which failure from rust or other sources may take place. In addition, by reducing the number of clamps required for muffler installation, the cost of such an installation is significantly reduced. Similarly, the invention eliminates the necessity of extensions or adapters required in many prior art replacement mufflers. This also has the effect of reducing cost of the muffler installation.

In instances where it is desired to reduce the diameter of the muffler inlet or outlet tubes, a conventional muffler clamp may be used to "compress" the AK tubing along at least a portion of the circumference. This plastic or maleability feature of the inlet and outlet tubing provides increased flexibility in muffler installation. For example, in instances where slight lateral offsets exist between, say, a tail pipe and an outlet tube, the outlet tube may be bent slightly to compensate for such offset.

The resizability feature of the present invention substantially eliminates the necessity for adapters to couple together exhaust and tail pipes with the respective tubes of the muffler. By eliminating the necessity for such adapters, material costs and labor savings are realized providing significant commercial advantage to the present invention over known mufflers and methods of installation.

Further modifications and alternative embodiments of the apparatus and method of this invention will be apparent to those skilled in this art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of the parts. For example, equivalent elements or materials may be substituted for those illustrated and described herein, parts may be reversed, and certain features of the invention may be utilized independently of the use of other features, all as would be apparent to one skilled in the art after having the benefit of this description of the invention. Accordingly, it is intended that all such alternatives, modifications, and variations which fall within the spirit and scope of the invention as defined in the appended claims be embraced thereby.

What is claimed is:

1. A muffler comprising:

an elongate body portion having a housing and end walls at opposite ends of said housing, each of said end walls defining an opening;

gas passage means interior said elongate body portion;

a first pipe fabricated from killed steel and connected at one end to said opening in a first of said end walls, the other end of said first pipe being operable to provide a first region of enlarged diameter with respect to a diameter of a remaining length of said first pipe, said first enlarged region having a diameter enlarged up to about 125% of the diameter of said remaining length of said first pipe.

2. The muffler of claim 1 and further comprising:

a second pipe fabricated from killed steel and connected at one end to said opening in a second of said end walls, the other end of said second pipe being operable to provide a second region of enlarged diameter with respect to a diameter of a remaining length of said second pipe, said second enlarged region having a diameter enlarged up to about 125% of the diameter of said remaining length of said second pipe.

3. The muffler of claim 2 wherein said first pipe has a length greater than a length of said second pipe.

4. The muffler of claim 2 wherein said killed steel comprises aluminum killed steel.

* * * * *

Dedication 4,164,267.—*Sam W. Meineke* and *Harold Nedell*, Bellaire, Tex. EXHAUST MUFFLER. Patent dated Aug. 14, 1979. Dedication filed Jan. 14, 1980, by the assignee, *Meineke Discount Muffler Shops, Inc.*

Hereby dedicates to the Public the entire term of said patent.

[*Official Gazette March 11, 1980.*]